(12) United States Patent
Ohno et al.

(10) Patent No.: US 12,360,235 B2
(45) Date of Patent: Jul. 15, 2025

(54) ANALYSIS DEVICE, ANALYSIS METHOD, AND STORAGE MEDIUM

(71) Applicant: NEC Corporation, Tokyo (JP)

(72) Inventors: Shouhei Ohno, Tokyo (JP); Takakazu Ishii, Tokyo (JP); Nao Akagawa, Tokyo (JP); Hiromichi Hirata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 478 days.

(21) Appl. No.: 17/788,007

(22) PCT Filed: Mar. 31, 2020

(86) PCT No.: PCT/JP2020/014752
§ 371 (c)(1),
(2) Date: Jun. 22, 2022

(87) PCT Pub. No.: WO2021/199245
PCT Pub. Date: Oct. 7, 2021

(65) Prior Publication Data
US 2023/0042178 A1    Feb. 9, 2023

(51) Int. Cl.
*G01S 13/90* (2006.01)
(52) U.S. Cl.
CPC .................................. *G01S 13/90* (2013.01)
(58) Field of Classification Search
CPC ....................................................... G01S 13/90
See application file for complete search history.

(56) References Cited

U.S. PATENT DOCUMENTS

| | | | |
|---|---|---|---|
| 7,142,984 B2 * | 11/2006 | Rahmes | G06V 10/30 702/5 |
| 7,298,891 B2 * | 11/2007 | McDowall | G06V 10/255 382/109 |

(Continued)

FOREIGN PATENT DOCUMENTS

| | | |
|---|---|---|
| CN | 109669184 A | 4/2019 |
| JP | 2009-087235 A | 4/2009 |

(Continued)

OTHER PUBLICATIONS

International Search Report for PCT Application No. PCT/JP2020/014752, mailed on Jun. 16, 2020.

(Continued)

*Primary Examiner* — Marcus E Windrich

(57) ABSTRACT

An analysis device according to an aspect of the present disclosure includes: at least one memory configured to store instructions; and at least one processor configured to execute the instructions to: extract values of geospatial information at a plurality of points on a ground surface from a plurality of types of geospatial information, the plurality of types of geospatial information each representing at least a state of the ground surface or a state beneath the ground surface; and train a determination model based on height displacements at the plurality of points and the extracted values of the geospatial information in such a way that the determination model determines a set of the geospatial information contributing to the height displacement based on at least a part of the values of the geospatial information.

4 Claims, 11 Drawing Sheets

(56) References Cited

U.S. PATENT DOCUMENTS

| | | | | |
|---|---|---|---|---|
| 8,244,026 | B2* | 8/2012 | Nahari | G01C 15/002 |
| | | | | 382/285 |
| 10,586,103 | B2* | 3/2020 | Sargent | G06F 18/23 |
| 2016/0321818 | A1* | 11/2016 | Shorter | G06T 19/006 |
| 2020/0166626 | A1* | 5/2020 | Toriya | G01S 13/426 |
| 2022/0312698 | A1* | 10/2022 | Burkey | G06Q 10/063 |
| 2023/0102406 | A1* | 3/2023 | Veronesi | G06N 3/084 |
| | | | | 702/2 |

FOREIGN PATENT DOCUMENTS

| | | |
|---|---|---|
| JP | 2018-048898 A | 3/2018 |
| JP | 2018-194404 A | 12/2018 |
| JP | 2019-035598 A | 3/2019 |
| JP | 2019-85712 A | 6/2019 |
| JP | 2020-20740 A | 2/2020 |
| WO | 2015/041295 A1 | 3/2015 |

OTHER PUBLICATIONS

English translation of Written opinion for PCT Application No. PCT/JP2020/014752, mailed on Jun. 16, 2020.
Riki Eto, Ryohei Fujimaki, Satoshi Morinaga, Hiroshi Tamano, "Fully-Automatic Bayesian Piecewise Sparse Linear Models", Proceedings of the Seventeenth International Conference on Artificial Intelligence and Statistics, PMLR 33, pp. 238-246, 2014.
Communication dated Apr. 25, 2023 issued by the Japanese Patent Office for Japanese Patent Application No. 2022-512969.

\* cited by examiner

ANALYSIS DEVICE, ANALYSIS METHOD, AND STORAGE MEDIUM

This application is a National Stage Entry of PCT/JP2020/014752 filed on Mar. 31, 2020, the contents of all of which are incorporated herein by reference, in their entirety.

TECHNICAL FIELD

The present disclosure relates to a technique for analyzing displacement in a height of a ground surface, and more particularly, to a technique for analyzing a height of the ground surface measured by a synthetic aperture radar (SAR).

BACKGROUND ART

PTL 1 describes a ground variation determination method for determining the presence or absence of a ground variation based on an interference SAR image by using a variation determination model generated by machine learning.

CITATION LIST

Patent Literature

[PTL 1] Japanese Unexamined Patent Application No. 2018-194404

SUMMARY OF INVENTION

Technical Problem

In the technique described in PTL 1, it is possible to determine the presence or absence of a variation in a ground surface. However, it is not possible to determine a factor of the variation in a height of the ground surface by the technique described in PTL 1.

An object of the present disclosure is to provide an analysis device or the like capable of determining the factor of the variation in the height of the ground surface.

Solution to Problem

An analysis device according to an aspect of the present disclosure includes: first extraction means for extracting values of geospatial information at a plurality of points on a ground surface from a plurality of types of geospatial information, the plurality of types of geospatial information each representing at least a state of the ground surface or a state beneath the ground surface; and training means for training a determination model based on height displacements at the plurality of points and the extracted values of the geospatial information in such a way that the determination model determines a set of the geospatial information contributing to the height displacement based on at least a part of the values of the geospatial information.

An analysis device according to an aspect of the present disclosure includes: first extraction means for extracting values of geospatial information at a plurality of points on a ground surface from a plurality of types of geospatial information, the plurality of types of geospatial information each representing at least a state of the ground surface or a state beneath the ground surface; and training means for training a determination model based on height displacements at the plurality of points and the extracted values of the geospatial information in such a way that the determination model predicts the height displacement based on at least a part of the values of the geospatial information.

An analysis method according to an aspect of the present disclosure includes: extracting values of geospatial information at a plurality of points on a ground surface from a plurality of types of geospatial information, the plurality of types of geospatial information each representing at least a state of the ground surface or a state beneath the ground surface; and training a determination model based on height displacements at the plurality of points and the extracted values of the geospatial information in such a way that the determination model determines a set of the geospatial information contributing to the height displacement based on at least a part of the values of the geospatial information.

An analysis method according to an aspect of the present disclosure includes: extracting values of geospatial information at a plurality of points on a ground surface from a plurality of types of geospatial information, the plurality of types of geospatial information each representing at least a state of the ground surface or a state beneath the ground surface; and training a determination model based on height displacements at the plurality of points and the extracted values of the geospatial information in such a way that the determination model predicts the height displacement based on at least a part of the values of the geospatial information.

A storage medium according to an aspect of the present disclosure stores a program for causing a computer to execute: first extraction processing of extracting values of geospatial information at a plurality of points on a ground surface from a plurality of types of geospatial information, the plurality of types of geospatial information each representing at least a state of the ground surface or a state beneath the ground surface; and training processing of training a determination model based on height displacements at the plurality of points and the extracted values of the geospatial information in such a way that the determination model determines a set of the geospatial information contributing to the height displacement based on at least a part of the values of the geospatial information.

A storage medium according to an aspect of the present disclosure stores a program for causing a computer to execute: first extraction processing of extracting values of geospatial information at a plurality of points on a ground surface from a plurality of types of geospatial information, the plurality of types of geospatial information each representing at least a state of the ground surface or a state beneath the ground surface; and training processing of training a determination model based on height displacements at the plurality of points and the extracted values of the geospatial information in such a way that the determination model predicts the height displacement based on at least a part of the values of the geospatial information.

An aspect of the present disclosure is also achieved by a program stored in the above-described storage medium.

Advantageous Effects of Invention

The present disclosure has an effect of being able to determine a factor of a variation in a height of a ground surface.

EXAMPLE EMBODIMENT

Hereinafter, example embodiments of the present disclosure will be described in detail with reference to the drawings.

First Example Embodiment

<Configuration>

Figure 1:
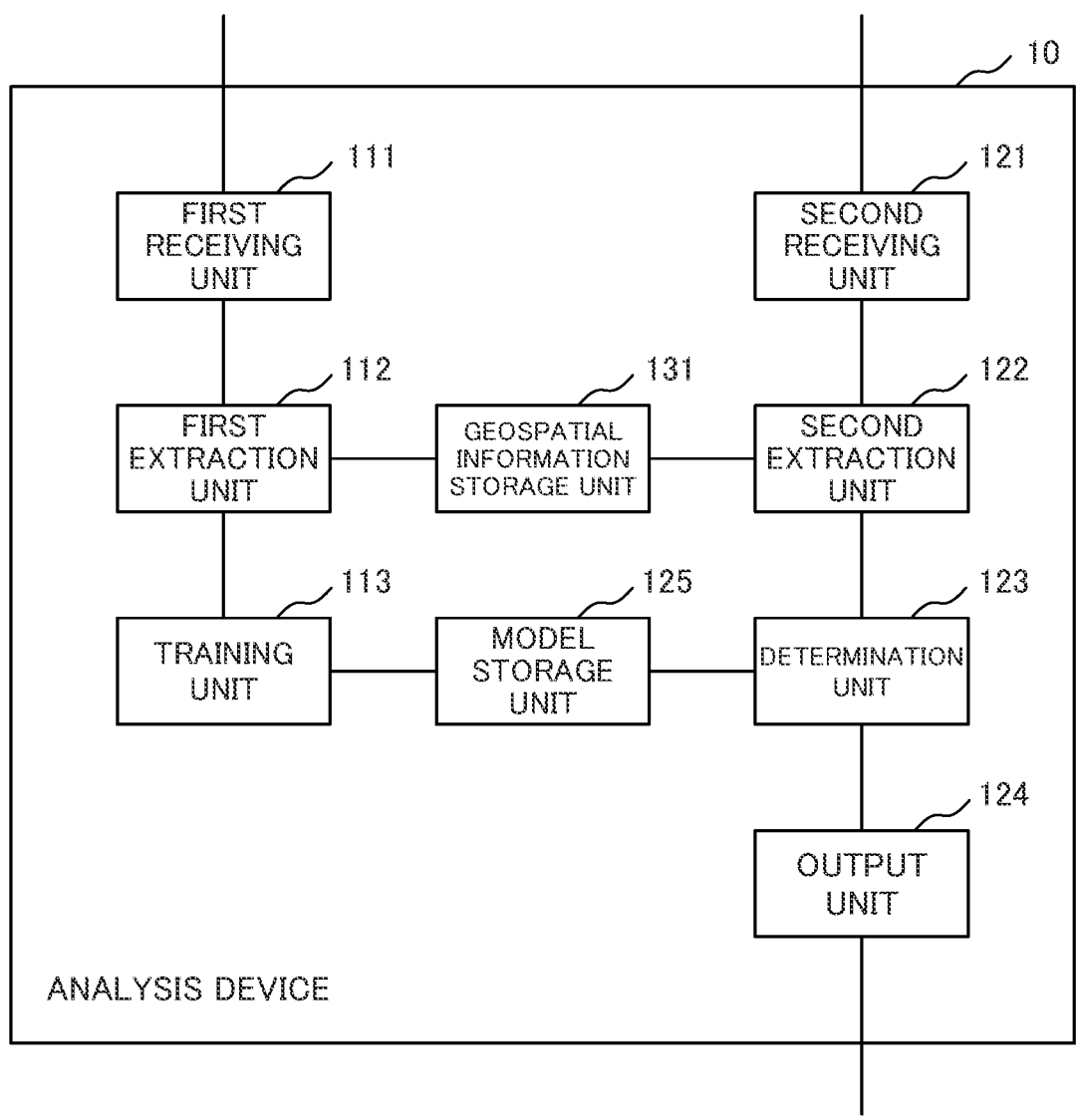
FIG. 1 is a block diagram illustrating an example of a configuration of an analysis device according to first and second example embodiments of the present disclosure.

FIG. 1 is a block diagram illustrating an example of a configuration of an analysis device 10 according to a first example embodiment of the present disclosure. In the example illustrated in FIG. 1, the analysis device 10 includes a first receiving unit 111, a first extraction unit 112, a training unit 113, a second receiving unit 121, a second extraction unit 122, a determination unit 123, an output unit 124, a model storage unit 125, and a geospatial information storage unit 131. The analysis device 10 may be achieved as a combination of two or more devices communicably connected to each other. Furthermore, a terminal device through which a user inputs data to the analysis device 10 may be communicably connected to the analysis device 10 via, for example, a communication network. An example in which the analysis device 10 is achieved as a combination of three devices communicably connected to each other will be described later as a modification.

<<First Receiving Unit 111>>

The first receiving unit 111 receives data representing a height displacement of a ground surface as training data. For example, the user may input data representing the height displacement of the ground surface to the first receiving unit 111 using the terminal device described above. In this case, the first receiving unit 111 receives data representing the height displacement of the ground surface from the terminal device.

The height displacement represents, for example, a transition of the height at the same point (or a point considered to be the same) on the ground surface obtained by observation at a plurality of past time points. The height displacement may be referred to as a variation in the height. The height is, for example, a height at a point on the ground surface obtained by observation using a radar mounted on a flying object such as an artificial satellite or an aircraft as a synthetic aperture radar (SAR). In the following description, such observation is referred to as observation by a synthetic aperture radar (SAR). The transition of the height may be represented by, for example, data that can specify a plurality of values representing the heights obtained by observation at a plurality of past time points and the order in which the heights were observed.

The data representing the transition of the height may be, for example, data including a plurality of sets of a value representing the height and data representing a time point at which the height is obtained by observation. The unit of data representing the time point may be appropriately determined. For example, data representing the time point may represent a date, or may represent a date and time. The unit of time may also be determined as appropriate.

Hereinafter, data representing the height displacement at a point on the ground surface is referred to as displacement data. The displacement data may include information (for example, latitude and longitude information) representing the position of the point on the ground surface where the height displacement represented by the displacement data is measured. The information representing the position may be other information that can specify the position on the ground surface. Hereinafter, the information representing the position of the point is referred to as point information.

The above-described height displacement of the ground surface may represent the height displacement at each of a plurality of points on the ground surface. Data representing the height displacement of the ground surface is referred to as ground surface displacement data. The ground surface displacement data may be a set of displacement data at a plurality of points.

The data representing the height displacement of the ground surface received as the training data by the first receiving unit 111 is referred to as training displacement data. The training displacement data may be data (also referred to as an aging displacement map) representing a time-series displacement of the ground surface of the region obtained by analyzing observation data obtained by observing the same region many times in multiple times by SAR. The transition of the time-series displacement is referred to as an aged displacement.

The first receiving unit 111 sends the received training displacement data to the first extraction unit 112.

<<First Extraction Unit 112>>

The first extraction unit 112 receives the training displacement data from the first receiving unit 111. For example, the first extraction unit 112 extracts, from the training displacement data, point information of a point where a transition of the height represented by the displacement data included in the training displacement data is observed. The first extraction unit 112 extracts a value of the geospatial information at a point whose position is represented by the extracted point information from the geospatial information stored in the geospatial information storage unit 131 described later.

In the present example embodiment, the geospatial information is, for example, information representing at least one of a state of the ground surface and a state beneath the ground surface. The geospatial information may be at least one of information obtained from a so-called geographic information system. The geospatial information may be data obtained by observation from an artificial satellite, an aircraft, or the like. The geospatial information may be data obtained by field investigation. The geospatial information may be information representing a result of analysis based on data obtained by measurement or investigation. The geospatial information may be information artificially determined based on data obtained by measurement or investigation. The geospatial information may be referred to as geographic information system (GIS) data.

The geospatial information may be obtained from the geographic information system in advance and stored in the geospatial information storage unit 131. A plurality of types of geospatial information may be stored in the geospatial information storage unit 131. The geospatial information may be represented in a format in which a value of the geospatial information at a point specified by the point information (for example, latitude and longitude) can be specified. A specific example of the geospatial information will be described in detail later.

The first extraction unit 112 may extract a value of a predetermined type of geospatial information at a point specified by the point information. The first extraction unit 112 may extract values at points specified by the point information of all types of geospatial information stored in the geospatial information storage unit 131. In a case where there is the geospatial information having no value at the point specified by the point information, the first extraction unit 112 may not extract the value of the geospatial information. In a case where there is the geospatial information having no value at the point specified by the point information, the first extraction unit 112 may set the value of the geospatial information to a value (for example, 0 or the like) representing that there is no value.

The first extraction unit 112 sends the training displacement data (in other words, the aging displacement map) and the value of the extracted geospatial information in a region (specifically, a plurality of points in the region) in which the training displacement data represents the aged displacement to the training unit 113.

<<Geospatial Information Storage Unit 131>>

The geospatial information storage unit 131 stores geospatial information. The geospatial information is stored in the geospatial information storage unit 131 such that the state of the ground surface at the designated point can be specified.

The geospatial information may be represented by, for example, a value representing a state for each mesh in which the ground surface is divided. In this case, the first extraction unit 112 extracts a value of the geospatial information representing a state in the mesh including the position specified by the point information as a value of the geospatial information of the point specified by the point information. Size and shape of the mesh may be determined for each type of the geospatial information.

The geospatial information may be represented in other forms. The geospatial information may be represented by, for example, a boundary line between regions having different states and a value representing a state in a region delimited by the boundary line. In this case, the first extraction unit 1120 extracts a value representing a state in a region including the position specified by the point information as a value of the geospatial information of the point specified by the point information. The format of the geospatial information may be determined for each type of geospatial information.

The specific geospatial information may be, for example, a type of embankment developed land, an average inclination angle, an average precipitation amount (for example, average annual precipitation), a surface layer geology, designation of a steep slope, designation of a sediment disaster warning region, a liquefaction risk, availability of a rainwater infiltration basin, shake ease at the time of an earthquake, a drainage difficult lowland, urban region land use, a natural terrain classification, an artificial terrain classification, a surface layer geology, a river bed, and facility information (presence or absence of construction or the like).

The type of embankment developed land may represent how soil is mounded, which is determined by the shape of the ground surface on which embankment is performed. The type of the embankment developed land is, for example, "valley-filling type embankment" which is an embankment in which valleys and streams are filled by embankment, or "leveling type embankment" which is an embankment performed on a sloping land.

The type of embankment developed land may further represent a scale of embankment. In this case, for example, the type of embankment (for example, embankment having a region of 3000 square meters or more) that satisfies the criteria among the embankments obtained by filling valleys and streams with embankments may be a "large-scale valley filling type embankment". In this case, the type of embankment that does not satisfy the criteria among embankments obtained by filling valleys and streams with embankments may be "valley-filling type embankment". In addition, the type of embankment (for example, embankment in which an angle of a ground surface (also referred to as an original ground surface) before embankment with respect to a horizontal plane is 20 degrees or more and a height of embankment is 5 meters or more) that satisfies the criteria among the embankments performed on the sloping land may be large-scale embankment. In this case, the type of embankment that does not satisfy the criterion among the embankments performed on the sloping land may be the "bellows-type embankment".

The value of the type of the embankment developed land may be any one of mutually different numerical values appropriately allocated in advance to, for example, "valley-filled embankment", "bellows-type embankment", or the like.

Figure 9:
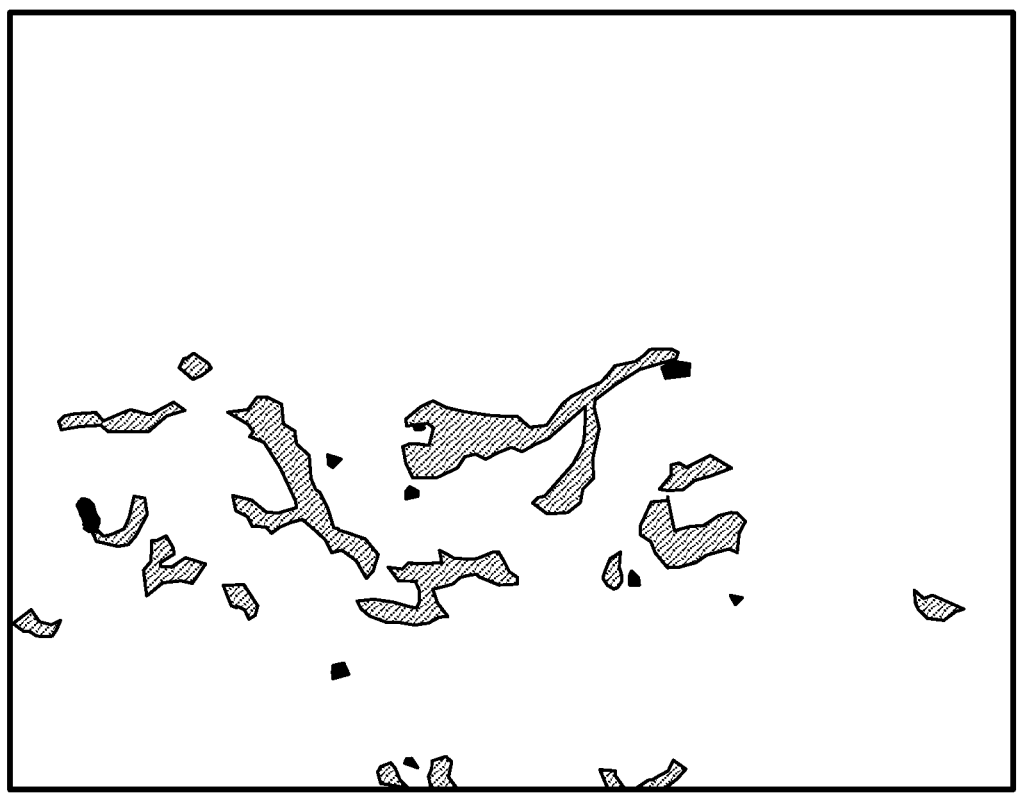
FIG. 9 is a diagram illustrating an example of a type of embankment developed land.

FIG. 9 is a diagram illustrating an example of the type of the embankment developed land. The example illustrated in FIG. 9 represents the distribution of the embankment developed land on the ground surface for each type of embankment developed land.

The average inclination angle may be, for example, data of an average inclination angle of the ground surface calculated on a mesh-by-mesh basis. The value of the average inclination angle may be the calculated average inclination angle of the ground surface.

The average precipitation amount may be, for example, data of an average precipitation amount on the ground surface calculated on a mesh-by-mesh basis. The value of the average precipitation amount may be the calculated average precipitation amount of the ground surface.

The surface layer geology may be data representing the geology (in other words, the type of geology) of the surface layer of the ground surface. The type of geology may be determined in advance. Different numerical values may be assigned to the types of geologies in advance. The value of the surface layer geology may be any one of numerical values appropriately assigned in advance to the geology.

The designation of a steep slope may be, for example, data representing whether the land is designated as a steep slope by a local government or the like. The value of designation of a steep slope may be, for example, a numerical value representing that it is designated as a steep slope or a numerical value representing that it is not designated as a steep slope. As these numerical values, different numerical values may be appropriately determined in advance.

The designation of a sediment disaster warning region may indicate whether the sediment disaster warning region is designated by, for example, a local government or the like. The value of the designation of a sediment disaster warning region may be, for example, a numerical value representing that it is designated as a sediment disaster warning zone or a numerical value representing that it is not designated as a sediment disaster warning zone. As these numerical values, mutually different numerical values may be determined in advance.

The liquefaction risk may be, for example, data representing the degree of risk of liquefaction of the land. The value of the liquefaction risk may be a numerical value representing the degree of risk of liquefaction of the land. The value of the liquefaction risk may be any one of a plurality of different numerical values representing different degrees. The numerical value representing the degree of risk may be appropriately determined in advance.

The availability of a rainwater infiltration basin may be, for example, information representing infiltration installation availability based on an "infiltration facility installation determination map" representing a result of determination as to whether the infiltration facility can be installed based on the topography, soil quality, and groundwater level. The value of the availability of a rainwater infiltration basin may be a numerical value representing that installation is possible or a numerical value representing that installation is not possible. As these numerical values, different numerical values may be appropriately determined in advance.

The shake ease at the time of an earthquake may be, for example, data representing a degree of shaking ease of the ground surface when an earthquake occurs. The value of the shake ease at the time of an earthquake may be a numerical value representing the degree of the ease of shaking of the ground surface when an earthquake occurs. The value of the shake ease at the time of an earthquake may be any one of a plurality of numerical values representing the degree of shaking ease of the ground surface when an earthquake occurs. The numerical value representing the degree of ease of shaking of the ground surface may be appropriately determined in advance.

The drainage difficult lowland may represent, for example, whether the land is the drainage difficult lowland estimated by the altitude of the land, the altitude difference from the surroundings, and the like. The value of the drainage difficult lowland may be a numerical value representing that the drainage difficult lowland is the drainage difficult lowland or a numerical value representing that the drainage difficult lowland is not the drainage difficult lowland. These numerical values may be appropriately determined in advance.

The urban region land use may be a type of land use in a region designated as a city. The type of land use in the urban region land use may be read from, for example, a satellite picture. A type of land use selected from a plurality of types determined in advance may be set for a region included in a region of a city. Different numerical values may be appropriately assigned in advance to each of a plurality of predetermined types. The value of the land use type set for the region may be a numerical value assigned to the type.

The natural terrain classification may be, for example, a type of terrain in a place that is not a building constructed by a human. Types of a plurality of terrain that can be set as the natural terrain classification may be appropriately determined in advance. A type of terrain selected from a plurality of types of terrain defined in advance as types that can be set as the natural terrain classification may be set for the region for which the natural terrain classification is set. Different numerical values may be assigned to the plurality of types. The value of the terrain in the natural terrain classification set in the region may be a numerical value assigned to the type of terrain set in the region.

The artificial terrain classification may be, for example, a type of terrain in a place where a human has modified the terrain or a place which is a building constructed by a human. A plurality of types of terrain that can be set as the artificial terrain classification may be appropriately determined in advance. A type of terrain selected from a plurality of types of terrain determined in advance as types that can be set as the artificial terrain classification may be set for the region for which the artificial terrain classification is set. Different numerical values may be assigned to the plurality of types. The value of the terrain in the artificial terrain classification set in the region may be a numerical value assigned to the type of terrain set in the region.

The surface layer geology may represent, for example, the type of soil on the ground surface. A plurality of types of soil may be appropriately determined in advance. Different predetermined numerical values may be assigned to the plurality of soil types. For example, the type of soil based on the result of the investigation may be set for the region. The value of the surface layer geology of the region may be a numerical value assigned to the type of soil set in the region.

Figure 10:
FIG. 10 is a diagram illustrating an example of a surface layer geology.

FIG. 10 is a diagram illustrating an example of the surface layer geology. FIG. 10 illustrates a distribution of geologies in a surface layer including the ground surface.

The river bed may be information representing whether the region is the river bed. A numerical value representing that it is the river bed (in other words, a numerical value representing the river bed) and another numerical value representing that it is not the river bed (in other words, a numerical value representing a non-river bed) may be appropriately determined in advance. Then, a numerical value representing the river bed may be set in the region which is the river bed. A numerical value representing the non-river bed may be set in a region other than the river bed. The value of the river bed of the region may be a numerical value representing the river bed or a numerical value representing the non-river bed set in the region.

Figure 11:
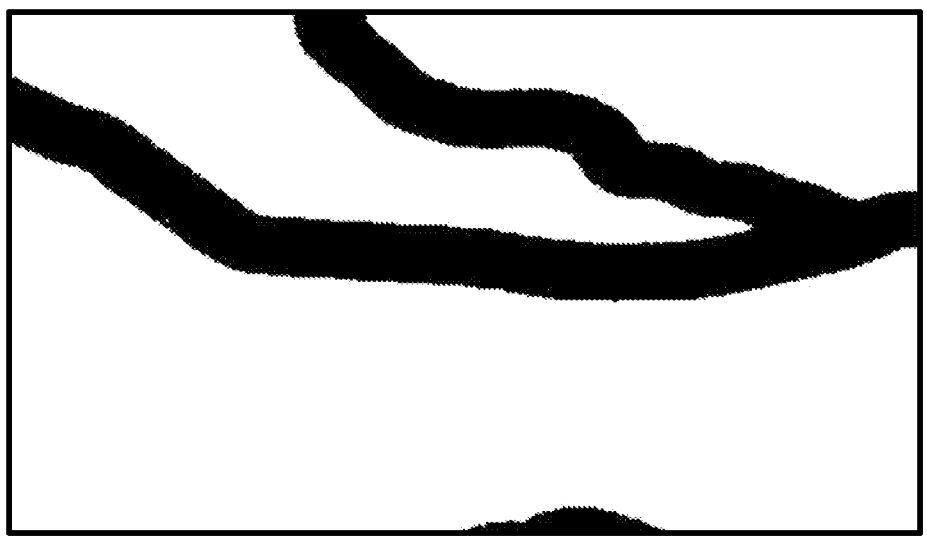
FIG. 11 is a diagram illustrating a river bed.

FIG. 11 is a diagram illustrating the river bed. In FIG. 11, a region determined to be the river bed and other regions are drawn.

The facility information indicates information regarding the facility. The facility information may represent any predetermined information among various pieces of information related to the facility. In the present example embodiment, the facility information indicates whether construction is in progress. A numerical value representing that construction is in progress and another numerical value representing that construction is not in progress may be appropriately set in advance. The facility information representing that the region is under construction may be set for the region under construction. The facility information representing that the region is not under construction may be set for the region that is not under construction. Specifically, a numerical value representing that the region is under construction may be set as the value of the facility information of the region under construction. A numerical value representing that the region is not under construction may be set as the facility information of the region that is not under construction.

<<Learning Unit 113>>

The training unit 113 receives the training displacement data and the value of the extracted geospatial information of the region in which the training displacement data represents the aged displacement from the first extraction unit 112.

The training unit 113 performs training using the received training displacement data and the value of the geospatial information. In this training, the training unit 113 trains a determination model in which the training unit 113 determines the set of the geospatial information that contributes to the height displacement at a target point based on at least a part of the value of the geospatial information of the target point. The determination model of the present example embodiment may represent, for example, a parameter of a program that receives a value of the geospatial information and outputs a set of the geospatial information contributing to the height displacement according to the value of the received geospatial information.

Specifically, the determination model may represent, for example, a parameter of a program that outputs, in a case where the received value of the geospatial information satisfies a condition for at least a part of the value of the geospatial information, a set of the geospatial information that contributes to the height displacement according to the condition. In this case, in the determination model, the value of the received geospatial information is represented by a condition for at least a part of the values of the geospatial information and a set of the geospatial information that contributes to the height displacement when the condition is satisfied. There may be a plurality of conditions. Each of the plurality of conditions may be a condition for at least a part of the geospatial information that is not necessarily the same. A processor (and a computer including such a processor.) that executes the above-described program using the above-described parameters is also referred to as a determiner in the following.

In the present example embodiment, the training unit 113 uses heterogeneous mixed learning as a training algorithm. However, the training algorithm may be another algorithm capable of training a determination model that receives the value of the geospatial information and outputs a set of the geospatial information contributing to the height displacement according to a condition for the value of the geospatial information. For example, multivariate analysis may also be used, such as multiple regression analysis. The heterogeneous mixed learning is described, for example, in the following reference.

(Reference) "Fully-Automatic Bayesian Piecewise Sparse Linear Models", Riki Eto, Ryohei Fujimaki, Satoshi Morinaga, Hiroshi Tamano, Proceedings of the Seventeenth International Conference on Artificial Intelligence and Statistics, PMLR 33, pp. 238-246, 2014.

The heterogeneous mixed learning refers to training of a heterogeneous mixed prediction model that performs prediction by combining prediction models based on sets of different explanatory variables. The heterogeneous mixed prediction model is represented by, for example, a plurality of sets of a set of conditional expressions and a prediction expression in a case where all conditional expressions included in the set are satisfied. Each conditional expression is, for example, a conditional expression for the value of any one explanatory variable. The set of the conditional expressions includes one or more conditional expressions. Each prediction expression is represented by a linear expression of explanatory variables that are not necessarily the same.

For example, the training unit 113 performs the heterogeneous mixed learning in such a way as to predict a future height displacement, for example, a height displacement after a predetermined period, with a height displacement as an objective variable and geospatial information as an explanatory variable. The predetermined period may be appropriately determined in advance. The training unit 113 can obtain a plurality of sets of a set of conditional expressions and a prediction expression in a case where all the conditional expressions included in the set are satisfied by performing heterogeneous mixed learning. Each of the conditional expressions represents a condition for a value of one piece of geospatial information, which is not necessarily identical. The set of the conditional expressions includes one or more conditional expressions, as described above. The set of the conditional expressions is referred to as a case division condition. The prediction expression is an expression for predicting the height displacement. Each of the prediction expressions is represented by a linear expression (linear combination) of one or more explanatory variables. Each of the explanatory variables represents any one piece of geospatial information. It can be said that the geospatial information represented by the explanatory variable included in the prediction expression is geospatial information that contributes to the height displacement.

In the following description, "the case division condition is satisfied" means that all conditional expressions included in the case division condition are satisfied. The prediction expression for the case division condition represents a prediction expression when the case division condition is satisfied.

When the case division condition is satisfied, the training unit 113 generates a determination model that determines the geospatial information represented by the explanatory variable included in the prediction expression for the case division condition as the geospatial information that contributes to the height displacement. The determination model outputs information of the determined geospatial information as the geospatial information that contributes to the height displacement. In the description of the present example embodiment and the following description, "generating a determination model" refers to training a determination model and generating data representing the determination model obtained by training.

The training unit 113 stores the obtained determination model (in other words, data representing the obtained determination model) in the model storage unit 125.

<<Second Receiving Unit 121>>

The second receiving unit 121 receives information (for example, latitude and longitude information) that specifies the position of a point on the ground surface. For example, the user may input, to the second receiving unit 121, information specifying the position of the point on the ground surface using the terminal device described above. In this case, the second receiving unit 121 receives information specifying the position of the point on the ground surface from the terminal device.

As described above, the information for specifying the position of the point is referred to as point information. The point information received by the second receiving unit 121 is referred to as target point information. A point whose position is specified by the target point information is referred to as a target point. The target point information may represent a position of one target point. In this case, the target point information may include, for example, one set of information representing latitude and information representing longitude. The target point information may indicate positions of a plurality of target points. In this case, the target point information may include, for example, a plurality of sets of information representing latitude and information representing longitude. The target point information may indicate, for example, positions of a plurality of points (also referred to as grid points) regularly arranged in the region. In this case, the target point information may include information for specifying a region and information for specifying a target point in the region. In this case, for example, in a case where the shape of the region is a rectangle, the information for specifying the region may include, for example, the latitude and longitude of one vertex, and two vectors (expressed as first and second vectors) starting from the vertex and representing two sides of the rectangle. The information for specifying the target point in the region may be, for example, an interval at which the target point exists in the direction of a first vector and an interval at which the target point exists in the direction of a second vector. The target point information is not limited to these examples.

Hereinafter, a case where there is one target point will be described. When there are a plurality of target points, each unit described below may repeat the operation for one target point with respect to the plurality of target points.

The second receiving unit 121 sends the received target point information to the second extraction unit 122.

<<Second Extraction Unit 122>>

The second extraction unit 122 receives the target point information from the second receiving unit 121. The second extraction unit 122 extracts a value of the geospatial information at the target point specified by the received target point information from the geospatial information stored in the geospatial information storage unit 131. The second extraction unit 122 may extract a predetermined value of the geospatial information from among all the geospatial information stored in the geospatial information storage unit 131. In this case, for example, the geospatial information that is not related to the condition for the value of the geospatial information and is confirmed in advance not to contribute to the height displacement may be excluded from the value extraction target. In a case where there is the geospatial information for which a value at the target point is not set, the second extraction unit 122 may set the value of the geospatial information to a numerical value (for example, 0) representing that there is no value.

The second extraction unit 122 sends the received target point information and the extracted value of the geospatial information at the target point to the determination unit 123.

<<Determination Unit 123>>

The determination unit 123 receives the value of the geospatial information at the target point from the second extraction unit 122. The determination unit 123 may receive the target point information from the second extraction unit 122.

The determination unit 123 determines a set of the geospatial information contributing to the height displacement at the target point according to the determination model stored in the model storage unit 125. Specifically, for example, the determination unit 123 specifies a condition satisfied by the received value of the geospatial information at the target point among a plurality of conditions included in the determination model. The determination unit 123 determines that the set of the geospatial information contributing to the height displacement when the specified condition is satisfied is the set of the geospatial information contributing to the height displacement at the target point. A set of the geospatial information contributing to the height displacement at the target point can be regarded as a factor of the variation in the height. The number of types of the geospatial information included in the set of the geospatial information may be one. The number of types of the geospatial information included in the set of the geospatial information may be two or more.

The determination unit 123 sends the determined set information of the geospatial information contributing to the height displacement at the target point to the output unit 124.

<<Output Unit 124>>

The output unit 124 receives, from the determination unit 123, information on a set of the geospatial information that contributes to the height displacement at the target point. The output unit 124 outputs the received information on the set of the geospatial information contributing to the height displacement at the target point. The output unit 124 may display, for example, on a display or the like, a set of the geospatial information contributing to the height displacement at the target point. The output unit 124 may send a set of the geospatial information contributing to the height displacement at the target point to another information processing device, the above-described terminal device, or the like.

<Operation>

Next, an operation of the analysis device 10 of the first example embodiment will be described in detail with reference to the drawings.

Figure 2:
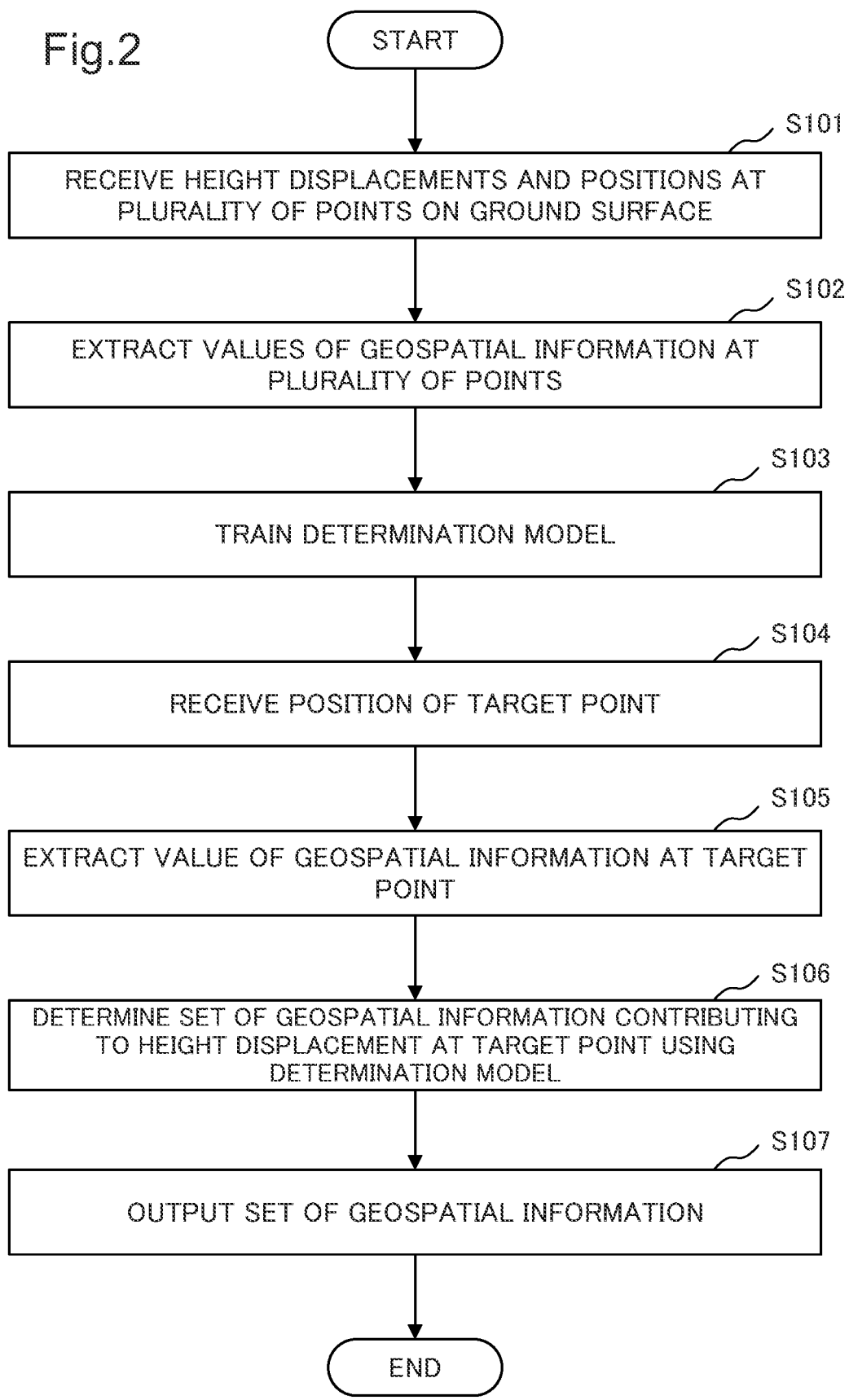
FIG. 2 is a flowchart illustrating an example of an operation of an analysis device 10 according to the first example embodiment of the present disclosure.

FIG. 2 is a flowchart illustrating an example of the operation of the analysis device 10 of the present example embodiment.

In the example illustrated in FIG. 2, first, the first receiving unit 111 receives height displacements and positions at a plurality of points on the ground surface (Step S101). Specifically, the first receiving unit 111 receives, as training displacement data, height displacement information at a plurality of points on the ground surface and point information representing positions of the plurality of points. As described above, the height displacement is, for example, the height displacement obtained by observation by SAR. The first receiving unit 111 sends the received height displacements and positions at the plurality of points on the ground surface to the first extraction unit 112.

Next, the first extraction unit 112 extracts values of the geospatial information at the plurality of points (Step S102). That is, the first extraction unit 112 extracts the value of the geospatial information at the position represented by the point information of each of the plurality of points received by the first receiving unit 111 from the geospatial information stored in the geospatial information storage unit 131. The first extraction unit 112 sends the data (that is, the height displacements at the plurality of points on the ground surface and the point information of the plurality of points) received as the training displacement data and the extracted value of the geospatial information to the training unit 113.

Next, the training unit 113 trains the determination model (Step S103). Specifically, the training unit 113 receives, from the first extraction unit 112, height displacements at the plurality of points on the ground surface, point information of the plurality of points, and values of the extracted geospatial information. The training unit 113 trains the above-described determination model using the height displacement and the value of the geospatial information at each of the plurality of points. The training unit 113 stores the determination model obtained as a result of training in the model storage unit 125.

The analysis device 10 may perform the operations from Step S101 to Step S103 in advance. Following Step S103, it is not necessary to perform the operation of Step S104.

In Step S104, the second receiving unit 121 receives the position of the target point (that is, the target point information). The second receiving unit 121 sends the received target point information to the second extraction unit 122.

The second extraction unit 122 extracts a value of the geospatial information at the target point (Step S105). The second extraction unit 122 may extract a value of the geospatial information at a position specified by the received target point information.

Then, the determination unit 123 determines a set of the geospatial information contributing to the height displacement at the target point using the determination model (Step S106).

The output unit 124 outputs the obtained set of the geospatial information (Step S107).

When there are a plurality of target points, the analysis device 10 may perform, for example, the operations from Step S104 to Step S107 for each of the plurality of target points. In Step S104, the analysis device 104 may collectively receive the height displacements and the positions of the plurality of target points. Then, the analysis device 104 may perform the operations of Steps S105 and S106 for each of the plurality of target points. In Step S107, the analysis device 104 may collectively output a set of the geospatial information of the plurality of target points.

Effects

The present example embodiment has an effect of being able to determine the factor of the variation in the height of the ground surface. This is because the training unit 113 trains the determination model for determining the set of the geospatial information that contributes to the height displacement at the position of the target point as the factor of the variation in the height based on at least a part of values of the geospatial information at the position of the target point.

First Modification of First Example Embodiment

Next, a first modification of the first example embodiment will be described. A configuration of an analysis device 10 of the present modification is the same as the configuration of the analysis device 10 of the first example embodiment. Function and operation of the analysis device 10 of the present modification are the same as the function and operation of the analysis device 10 of the first example embodiment except for the following differences.

<<Learning Unit 113>>

A determination model generated by a training unit 113 of the present modification outputs a value representing a degree of contribution of the geospatial information in addition to the information of the geospatial information that contributes to the height displacement.

As described above, the training unit 113 can obtain a plurality of sets of the case division condition and the prediction expression for the case division condition, for example, by performing heterogeneous mixed training with the height displacement as the objective variable and the geospatial information as the explanatory variable. Before training, the training unit 113 according to the present example embodiment converts the values of the geospatial information such that the value ranges of the geospatial information are the same (for example, 0 or more and 1 or less) for the geospatial information. As described above, the case division condition is a set of conditional expressions. The prediction expression for the case division condition is a prediction expression when all the conditional expressions included in the case division condition are satisfied. The prediction expression is represented by a linear expression of the explanatory variable. The explanatory variable represents geospatial information. The training unit 113 regards the geospatial information represented by the explanatory variable included in the prediction expression as the geospatial information that contributes to the height displacement. Then, the training unit 113 regards the coefficient of the explanatory variable representing the geospatial information in the prediction expression as the degree of contribution of the geospatial information.

The training unit 113 generates the following determination model. When the case division condition is satisfied, the determination model determines the geospatial information represented by the explanatory variable included in the prediction expression for the case division condition as the geospatial information that contributes to the height displacement. When the case division condition is satisfied, the determination model also determines the coefficient of the explanatory variable included in the prediction expression for the case division condition as the degree of contribution to the height displacement of the geospatial information represented by the explanatory variable. The determination model outputs information of the geospatial information determined as the geospatial information that contributes to the height displacement and information representing the degree of contribution to the height displacement of the geospatial information.

<<Determination Unit 123>>

According to the determination model stored in the model storage unit 125, the determination unit 123 determines the set of the geospatial information contributing to the height displacement at the target point and the degree of contribution of the geospatial information included in the set to the height displacement. Specifically, for example, the determination unit 123 specifies a condition satisfied by the received value of the geospatial information among a plurality of conditions included in the determination model. The determination unit 123 determines that the set of the geospatial information contributing to the height displacement when the specified condition is satisfied is the set of the geospatial information contributing to the height displacement at the target point. Further, the determination unit 123 determines that the degree of contribution of the geospatial information to the height displacement that contributes to the height displacement when the specified condition is satisfied is the degree of contribution of the geospatial information to the height displacement at the target point.

The determination unit 123 sends, to the output unit 124, information on the set of the geospatial information contributing to the height displacement at the target point and information representing the degree of contribution of the geospatial information included in the set.

<<Output Unit 124>>

The output unit 124 receives, from the determination unit 123, information on a set of the geospatial information that contributes to the height displacement at the target point and information representing the degree of the contribution of the geospatial information included in the set. The output unit 124 outputs the received information on the set of the geospatial information contributing to the height displacement at the target point and the information representing the degree of the contribution of the geospatial information included in the set. The output unit 124 may display, for example, the set of the geospatial information contributing to the height displacement at the target point and the degree of the contribution on a display or the like. The output unit 124 may send the set of the geospatial information contributing to the height displacement at the target point and the degree of the contribution to another information processing device, the above-described terminal device, or the like.

Second Modification of First Example Embodiment

Figure 3:
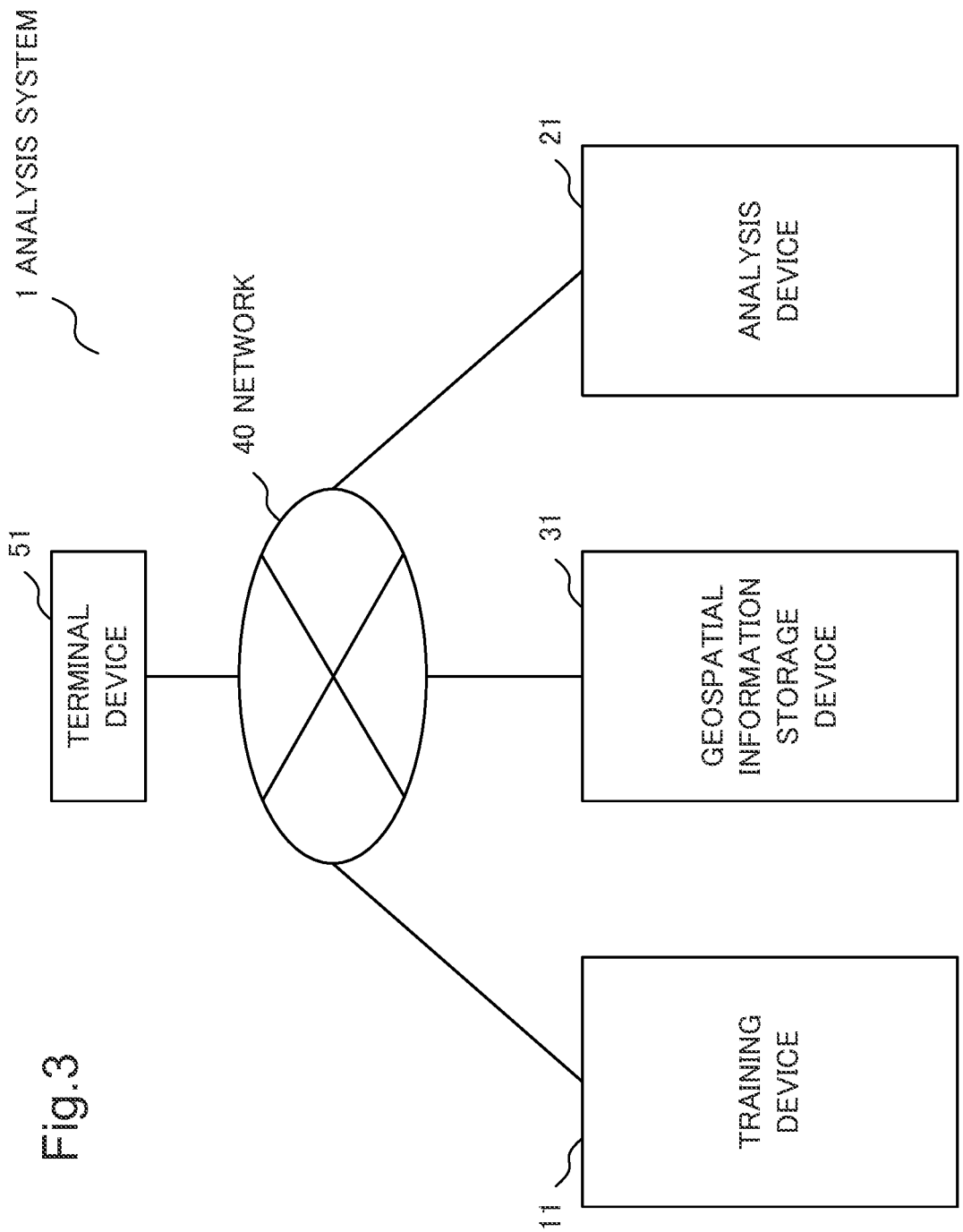
FIG. 3 is a block diagram illustrating a configuration of an analysis system according to a modification of the first and second example embodiments of the present disclosure.

FIG. 3 is a block diagram illustrating a configuration of an analysis system 1 according to a modification of the first example embodiment. In the example illustrated in FIG. 3, the analysis system 1 includes a training device 11, an analysis device 21, a geospatial information storage device 31, and a terminal device 51. The training device 11, the analysis device 21, the geospatial information storage device 31, and the terminal device 51 are communicably connected to each other by a network 40 that is a communication network. The analysis system 1 achieves the functions of the analysis device 10 of the first example embodiment by the training device 11, the analysis device 21, and the geospatial information storage device 31. The terminal device 51 is the above-described terminal device.

Figure 4:
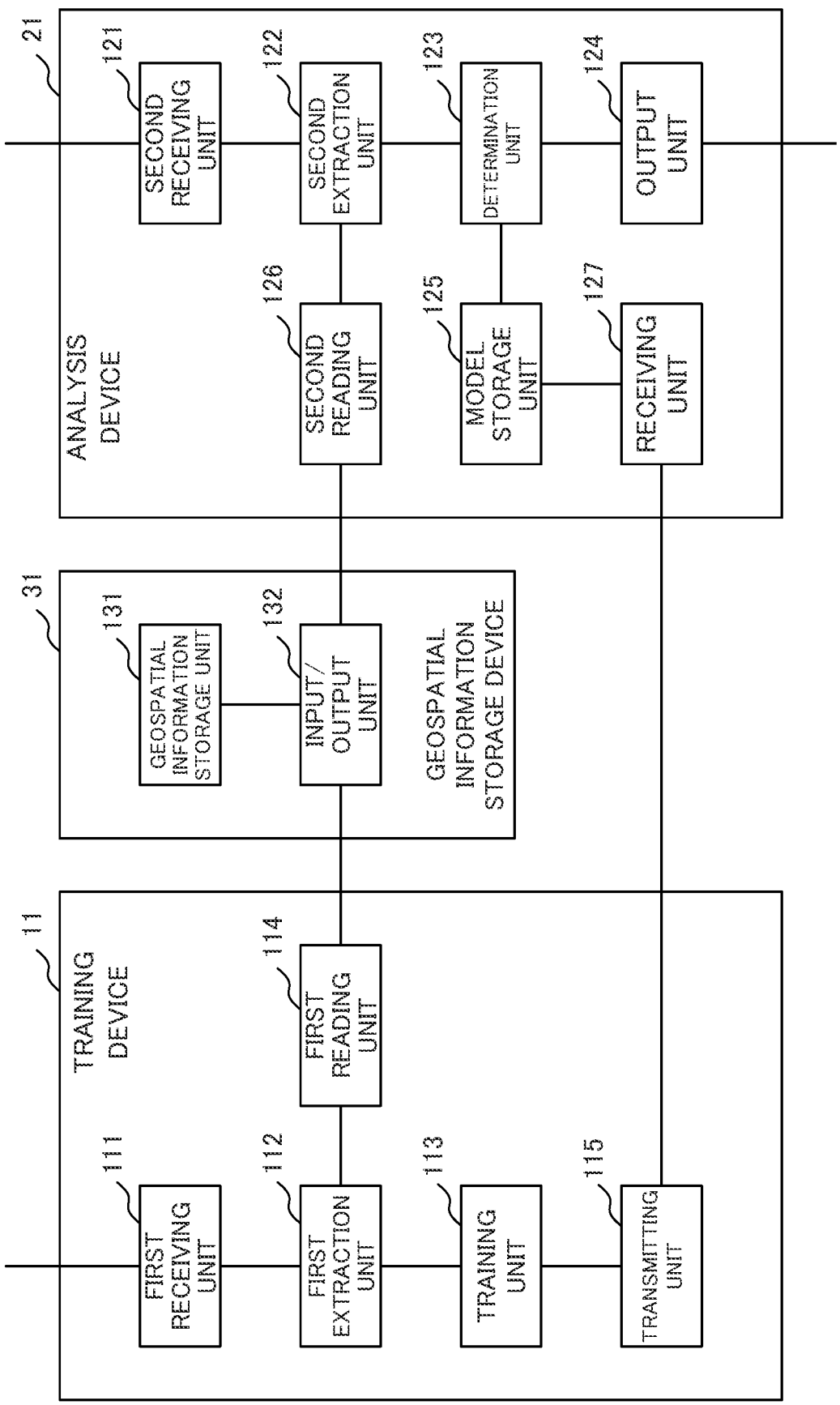
FIG. 4 is a block diagram illustrating an example of a detailed configuration of a training device, an analysis device, and a geospatial information storage device included in an analysis system of a modification of the first and second example embodiments of the present disclosure.

FIG. 4 is a block diagram illustrating an example of a detailed configuration of the training device 11, the analysis device 21, and the geospatial information storage device 31 included in the analysis system 1 of the present modification. In FIG. 4, data transfer among the components of the training device 11, the analysis device 21, and the geospatial information storage device 31 achieved by the network 40 of FIG. 3 is drawn by a line connecting the components.

The training device 11 includes a first receiving unit 111, a first extraction unit 112, a training unit 113, a first reading unit 114, and a transmitting unit 115. The first receiving unit 111, the first extraction unit 112, and the training unit 113 are the same as the parts having the same names assigned with the same reference numerals in the first example embodiment.

The first reading unit 114 reads the geospatial information from the geospatial information storage unit 131 of the geospatial information storage device 31 via an input/output unit 132. Specifically, the first reading unit 114 may transmit a request for the geospatial information to the input/output unit 132 of the geospatial information storage device 31, and receive the requested geospatial information read from the geospatial information storage unit 131 by the input/output unit 132 from the input/output unit 132. The request for the geospatial information may include point information specifying a point (for example, latitude and longitude information). The requested geospatial information refers to a value of the geospatial information of the point specified by the point information.

The transmitting unit 115 transmits the determination model (in other words, the parameter of the determiner) trained by the training unit 113 to the analysis device 21.

The analysis device 21 includes a second receiving unit 121, a second extraction unit 122, a determination unit 123, an output unit 124, a model storage unit 125, a second reading unit 126, and a receiving unit 127. The second receiving unit 121, the second extraction unit 122, the determination unit 123, the output unit 124, and the model storage unit 125 are the same as the parts having the same names assigned with the same reference numerals in the first example embodiment.

The second reading unit 126 reads the geospatial information from the geospatial information storage unit 131 of the geospatial information storage device 31 via the input/output unit 132. Specifically, the second reading unit 126 may transmit a request for the geospatial information to the input/output unit 132 of the geospatial information storage device 31, and receive the requested geospatial information read from the geospatial information storage unit 131 by the input/output unit 132 from the input/output unit 132. The request for the geospatial information may include point information specifying a point (for example, latitude and longitude information). The request for the geospatial information generated and transmitted by the second reading unit 126 may include type information specifying the type of the geospatial information. The type information may specify a plurality of types. In a case where the type information is included in the request for the geospatial information, as described later, the input/output unit 132 sends the values of all types of geospatial information specified by the type information at the point specified by the point information to the second reading unit 126.

The receiving unit 127 receives the determination model from the transmitting unit 115 of the training device 11. The receiving unit 127 stores the received determination model in the model storage unit 125.

The geospatial information storage device 31 includes a geospatial information storage unit 131 and an input/output unit 132. The geospatial information storage unit 131 is the same as the geospatial information storage unit 131 of the first example embodiment.

The input/output unit 132 receives the request for the geospatial information. A transmission source of the request for the geospatial information is the first reading unit 114 or the second reading unit 126. As described above, the request for geospatial information may include information specifying a point. The input/output unit 132 extracts a value of the geospatial information of the point specified by the information specifying the point included in the request for the geospatial information from the geospatial information stored in the geospatial information storage unit 131. The input/output unit 132 may extract values of all types of geospatial information of a specified point. The request for geospatial information may include information specifying a type of geospatial information. In this case, the input/output unit 132 may extract values of all types of geospatial information specified by the information specifying the type of geospatial information included in the request for geospatial information. The input/output unit 132 transmits the extracted value of the geospatial information to the transmission source of the request for geospatial information.

The operation of the analysis system 1 of the present modification is similar to the operation of the analysis device 10 of the first example embodiment illustrated in FIG. 2 except for the following differences. The above-described differences are, for example, that reading of the geospatial information is performed via the first reading unit 114 and the input/output unit 132, or via the second reading unit 126 and the input/output unit 132, and that delivery of the determination model is performed via the transmitting unit 115 and the receiving unit 127.

Second Example Embodiment

FIG. 1 is a diagram illustrating a configuration of an analysis device 10 according to a second example embodiment of the present disclosure. The configuration of the analysis device 10 of the present example embodiment is the same as the configuration of the analysis device 10 of the first example embodiment. The components of the analysis device 10 of the present example embodiment are the same as the components of the analysis device 10 of the first example embodiment assigned with the same names and reference numerals, except for the differences described below.

<<Learning Unit 113>>

A training unit 113 of the present example embodiment trains a determination model different from the determination model trained by the training unit 113 of the first example embodiment. In other respects, the training unit 113 of the present example embodiment is the same as the training unit 113 of the first example embodiment. For example, similarly to the training unit 113 of the first example embodiment, the training unit 113 of the present example embodiment receives, from a first extraction unit 112, the training displacement data and the value of the extracted geospatial information of the region in which the training displacement data indicates the aged displacement. Similarly to the training unit 113 of the first example embodiment, the training unit 113 of the present example embodiment stores the determination model obtained by training in a model storage unit 125.

The training unit 113 according to the present example embodiment also performs heterogeneous mixed learning in such a way as to predict, for example, the height displacement after a predetermined period with the height displacement as an objective variable and the geospatial information as an explanatory variable. The training unit 113 can obtain a plurality of sets of a set of conditional expressions and a prediction expression in a case where all the conditional expressions included in the set are satisfied by performing heterogeneous mixed learning. As described above, each of the conditional expressions represents a condition for a value of one piece of geospatial information, which is not necessarily identical. The set of the conditional expressions includes one or more conditional expressions, as described above. The set of the conditional expressions is referred to as a case division condition. The prediction expression is an expression for predicting the height displacement. Each of the prediction expressions is represented by a linear expression of one or more explanatory variables. Each of the explanatory variables represents any one piece of geospatial information. It can be said that the geospatial information represented by the explanatory variable included in the prediction expression is geospatial information that contributes to the height displacement.

In the following description, "the case division condition is satisfied" means that all conditional expressions included in the case division condition are satisfied. The prediction expression for the case division condition represents a prediction expression when the case division condition is satisfied.

When the case division condition is satisfied, the training unit 113 according to the present example embodiment generates a determination model for predicting the height displacement by a prediction expression for the case division condition. The determination model outputs information on the predicted height displacement.

<<Determination Unit 123>>

Similarly to the determination unit 123 of the first example embodiment, the determination unit 123 of the present example embodiment receives the value of the geospatial information at the target point from the second extraction unit 122. The determination unit 123 may receive the target point information from the second extraction unit 122.

The determination unit 123 of the present example embodiment predicts the height displacement at the target point according to the determination model stored in the model storage unit 125. Specifically, for example, the determination unit 123 specifies a condition satisfied by the received value of the geospatial information at the target point among a plurality of conditions included in the determination model. The determination unit 123 predicts the height displacement by using the prediction expression when the specified condition is satisfied.

The determination unit 123 sends information representing the predicted height displacement to the output unit 124.

<<Output Unit 124>>

The output unit 124 receives information representing the predicted height displacement from the determination unit 123. Output unit 124 outputs the received information representing the height displacement. An output destination of the output unit 124 is similar to the output unit of the output unit 124 of the first example embodiment.

<Operation>

Next, an operation of the analysis device 10 of the present example embodiment will be described.

Figure 5:
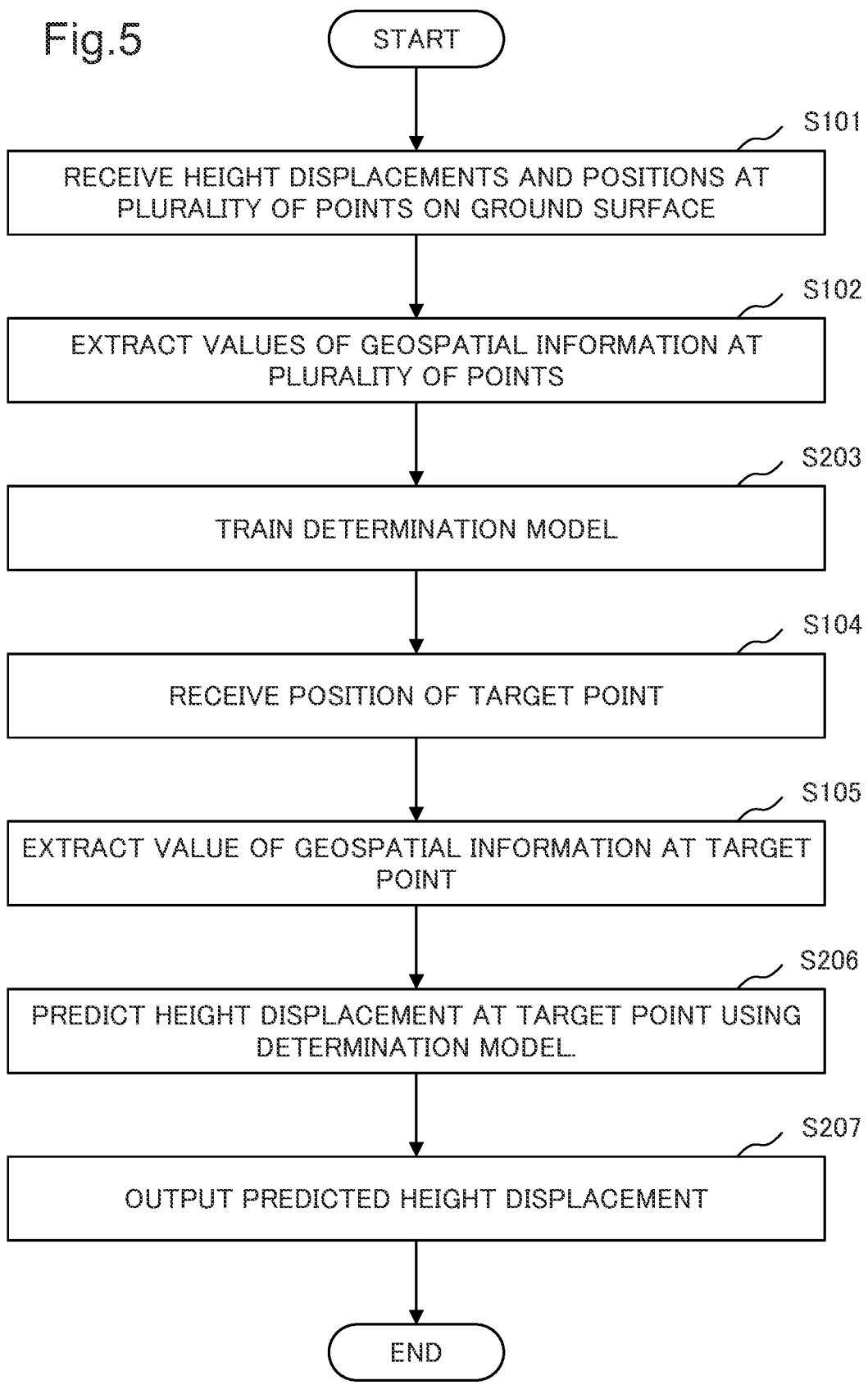
FIG. 5 is a flowchart illustrating an example of an operation of the analysis device according to the first example embodiment of the present disclosure.

FIG. 5 is a flowchart illustrating an example of the operation of the analysis device 10 of the present example embodiment.

The operations in Steps S101 and S102 illustrated in FIG. 5 are the same as the operations in Steps S101 and S102 of the analysis device 10 of the first example embodiment illustrated in FIG. 2.

In Step S203, the training unit 113 of the present example embodiment generates the above-described determination model for predicting the height displacement.

The analysis device 10 of the present example embodiment does not need to perform the operations after Step S104 following Steps S101, S102, and S203.

The operations in Steps S104 and S105 are the same as the operations in Steps S104 and S105 of the analysis device 10 of the first example embodiment illustrated in FIG. 2.

In Step S206, the determination unit 123 predicts the height displacement at the target point using the determination model. In Step S207, the output unit 124 outputs the predicted height displacement.

Effects

The present example embodiment has an effect of predicting the variation in the height of the ground surface. The reason is that the training unit 113 trains the determination model for predicting the height displacement at the position of the target point based on at least a part of the value of the geospatial information at the position of the target point.

First Modification of Second Example Embodiment

Next, a first modification of the second example embodiment will be described. A configuration of an analysis device 10 of the present modification is the same as the configuration of the analysis device 10 of the second example embodiment illustrated in FIG. 1.

A training unit 113 may perform heterogeneous mixed learning for each of a plurality of periods to generate a plurality of determination models that individually predict height displacements after the periods elapse. The length of each of the plurality of periods may be, for example, a multiple of the length of a predetermined period determined in advance. The length of each of the plurality of periods may be determined according to an appropriately determined rule. The length of each of the plurality of periods may be specified by the user, for example. The training unit 113 stores the plurality of generated determination models in the model storage unit 125. Each of the determination models may be configured to predict a height displacement and output information representing the predicted height displacement and information representing a period.

The determination unit 123 reads a plurality of determination models stored in the model storage unit 125. The determination unit 123 predicts the height displacement after different periods have elapsed according to the plurality of read determination models. The determination unit 123 sends the prediction of the height displacement after the different periods have elapsed and the periods to output unit 124.

The output unit 124 outputs the prediction of the height displacement after each of the plurality of periods has elapsed. The output unit 124 may output information representing the plurality of periods and the prediction of the height displacement after each period has elapsed.

Second Modification of Second Example Embodiment

Next, a second modification of the second example embodiment will be described. A configuration of an analysis device 10 of the present modification is the same as the configuration of the analysis device 10 of the second example embodiment illustrated in FIG. 1.

In a case where a case division condition is satisfied, a training unit 113 of the present modification predicts a height displacement after a predetermined period elapses by a prediction expression for the case division condition, and further generates a determination model for analyzing the geospatial information contributing to the height displacement. The determination model analyzes the geospatial information contributing to the height displacement by analyzing the geospatial information represented by the explanatory variable included in the prediction expression for predicting the height displacement as the geospatial information contributing to the height displacement as described above. In addition to the prediction of the height displacement, the determination model outputs information of the analyzed geospatial information as the geospatial information that contributes to the height displacement.

The determination unit 123 predicts the height displacement and analyzes the geospatial information contributing to the height displacement by the determination model. The determination unit 123 sends information representing the predicted height displacement and information representing the geospatial information contributing to the height displacement to the output unit 124.

The output unit 124 outputs information representing the predicted height displacement and information representing the geospatial information that contributes to the height displacement.

Third Modification of Second Example Embodiment

Next, a third modification of the second example embodiment will be described. A configuration of an analysis device 10 of the present modification is the same as the configuration of the analysis device 10 of the second example embodiment illustrated in FIG. 1.

The second modification of the second example embodiment can also be configured as in the first modification of the second example embodiment. The training unit 113 of the present modification may generate the same determination model as the determination model of the second modification of the second example embodiment for each of a plurality of different periods. Specifically, the training unit 113 generates a plurality of determination models for predicting the height displacement after different periods elapse and determining the factor of the displacement. As described above, the factor is any geospatial information.

The determination unit 123 predicts the height displacement after a plurality of different periods elapses at the target point and determines the factor contributing to the height displacement by the plurality of generated determination models. The determination unit 123 sends, to the output unit 124, the information representing the predicted height displacement after the plurality of different periods elapses at the target point and the information representing the factor contributing to the height displacement.

The output unit 124 outputs the information representing the predicted height displacement and the information representing a factor contributing to the height displacement.

Fourth Modification of Second Example Embodiment

Next, a fourth modification of the second example embodiment will be described. A configuration of an analysis device 10 of the present modification is the same as the configuration of the analysis device 10 of the second example embodiment illustrated in FIG. 1.

The present modification is an example in which the second modification of the second example embodiment is modified as in the first modification of the first example embodiment. In other words, in addition to predicting the height displacement and determining the factor, the training unit 113 of the present modification may generate a determination model that determines the degree of the contribution of the factor. In addition to the prediction of the height displacement, the determination unit 123 of the present modification determines the factor of the height displacement and the degree of the contribution of the factor. The determination unit 123 of the present modification may send information representing the predicted height displacement and information representing the determined factor and the degree of contribution of the factor to the output unit 124. The output unit 124 may output information representing the predicted height displacement and information representing the determined factor and the degree of the contribution of the factor.

Fifth Modification of Second Example Embodiment

Next, a fifth modification of the second example embodiment will be described. A configuration of an analysis device 10 of the present modification is the same as the configuration of the analysis device 10 of the second example embodiment illustrated in FIG. 1.

The present modification is an example in which the third modification of the second example embodiment is modified as in the first modification of the first example embodiment. In other words, the training unit 113 of the present modification generates a plurality of determination models for determining the degree of the contribution of the factor in addition to predicting the height displacement after different periods elapse and determining the factor of the height displacement. The determination unit 123 of the present modification determines the prediction of the height displacement after different periods elapse, the factor of the height displacement, and the degree of the contribution of the factor by the plurality of determination models. The determination unit 123 may send information representing the predicted height displacement and information representing the determined factor and the degree of contribution of the factor to the output unit 124. The output unit 124 outputs information representing the predicted height displacement and information representing the determined factor and the degree of contribution of the factor.

Sixth Modification of Second Example Embodiment

The functions of the analysis device 10 of the second example embodiment and the first to fifth modifications of the second example embodiment can be achieved by a set of a plurality of devices as in the second modification of the first example embodiment.

Third Example Embodiment

Next, a third example embodiment of the present disclosure will be described in detail with reference to the drawings.

<Configuration>

Figure 6:
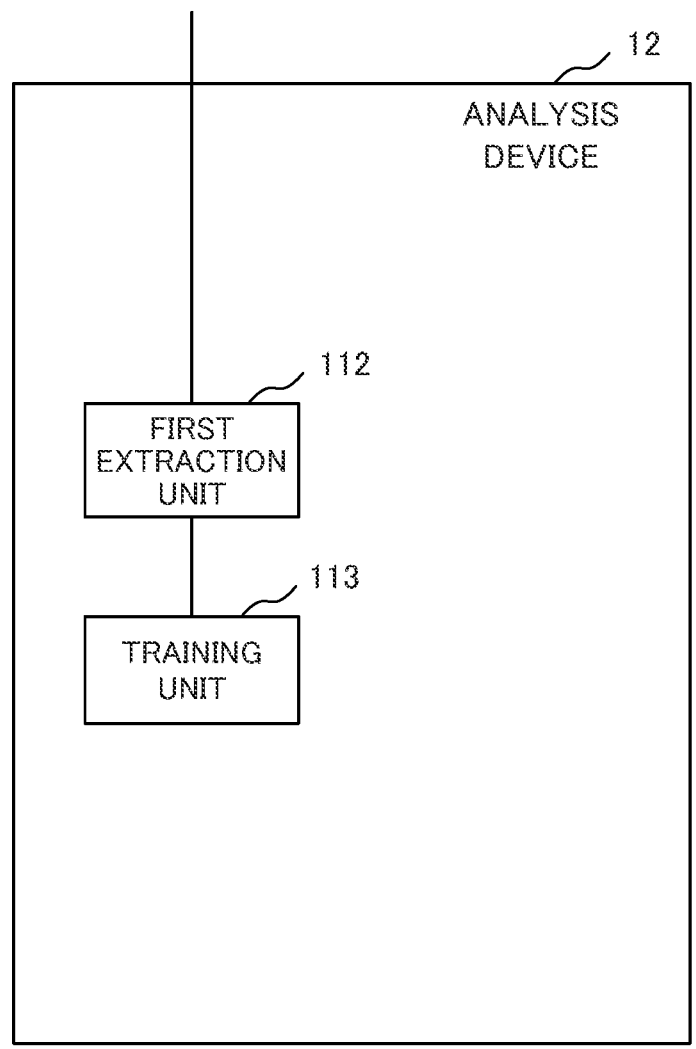
FIG. 6 is a diagram illustrating an example of a configuration of an analysis device according to third and fourth example embodiments of the present disclosure.

FIG. 6 is a diagram illustrating an example of a configuration of an analysis device 12 of the present example embodiment.

The analysis device 12 according to one aspect of the present disclosure illustrated in FIG. 6 includes a first extraction unit 112 and a training unit 113. The first extraction unit 112 extracts a value of geospatial information at each of a plurality of points on a ground surface from a plurality of types of geospatial information that represent at least one of a state of the ground surface and a state beneath the ground surface. The training unit 113 trains a determination model based on the height displacement at the plurality of points and the extracted value of the geospatial information in such a way that the determination model determines a set of the geospatial information that contributes to a height displacement based on at least a part of the value of the geospatial information. The first extraction unit 112 and the training unit 113 of the present example embodiment function similarly to the first extraction unit 112 and the training unit 113 of the first example embodiment.

<Operation>

Figure 7:
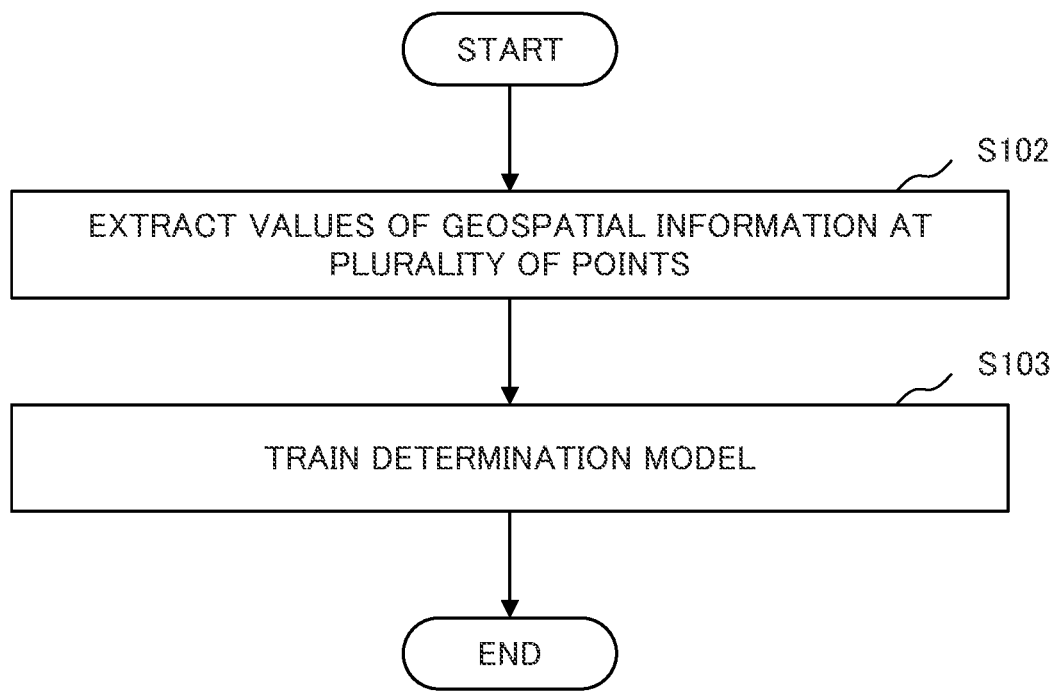
FIG. 7 is a flowchart illustrating an example of an operation of the analysis device according to the third and fourth example embodiments of the present disclosure.

FIG. 7 is a flowchart illustrating an example of an operation of the analysis device 12 of the present example embodiment.

In the example illustrated in FIG. 7, the first extraction unit 112 extracts values of the geospatial information at the plurality of points (Step S102). Then, the training unit 103 trains the determination model (Step S103). The training unit 103 of the present example embodiment trains a determination model similar to the determination model of the first example embodiment, similarly to the training unit 103 of the first example embodiment.

Effects

The present example embodiment has the same effect as that of the first example embodiment. The reason is the same as the reason why the effect of the first example embodiment occurs.

Fourth Example Embodiment

Next, a fourth example embodiment of the present disclosure will be described in detail with reference to the drawings.

<Configuration>

FIG. 6 is a diagram illustrating an example of a configuration of an analysis device 12 of the present example embodiment.

The analysis device 12 according to one aspect of the present disclosure illustrated in FIG. 6 includes a first extraction unit 112 and a training unit 113. The first extraction unit 112 extracts a value of geospatial information at each of a plurality of points on a ground surface from a plurality of types of geospatial information that represent at least one of a state of the ground surface and a state beneath the ground surface. The training unit 113 trains the determination model based on the height displacement at the plurality of points and the extracted value of the geospatial information in such a way that the determination model predicts the height displacement based on at least a part of the value of the geospatial information. The first extraction unit 112 and the training unit 113 of the present example embodiment function similarly to the first extraction unit 112 and the training unit 113 of the second example embodiment.

<Operation>

FIG. 7 is a flowchart illustrating an example of an operation of the analysis device 12 of the present example embodiment.

In the example illustrated in FIG. 7, the first extraction unit 112 extracts values of the geospatial information at the plurality of points (Step S102). Then, the training unit 103 trains the determination model (Step S103). The training unit 103 of the present example embodiment trains a determination model similar to the determination model of the second example embodiment, similarly to the training unit 103 of the second example embodiment.

Effects

The present example embodiment has the same effect as the second example embodiment. The reason is the same as the reason why the effect of the first example embodiment occurs.

Other Example Embodiments

Each of the analysis device 10, the training device 11, the analysis device 12, and the analysis device 21 according to the example embodiments of the present disclosure can be achieved by a computer including a memory in which a program read from a storage medium is loaded and a processor that executes the program. Each of the analysis device 10, the training device 11, the analysis device 12, and the analysis device 21 according to the example embodiment of the present disclosure can also be achieved by dedicated hardware. Each of the analysis device 10, the training device 11, the analysis device 12, and the analysis device 21 according to the example embodiment of the present disclosure can also be achieved by a set of the above-described computer and dedicated hardware.

Figure 8:
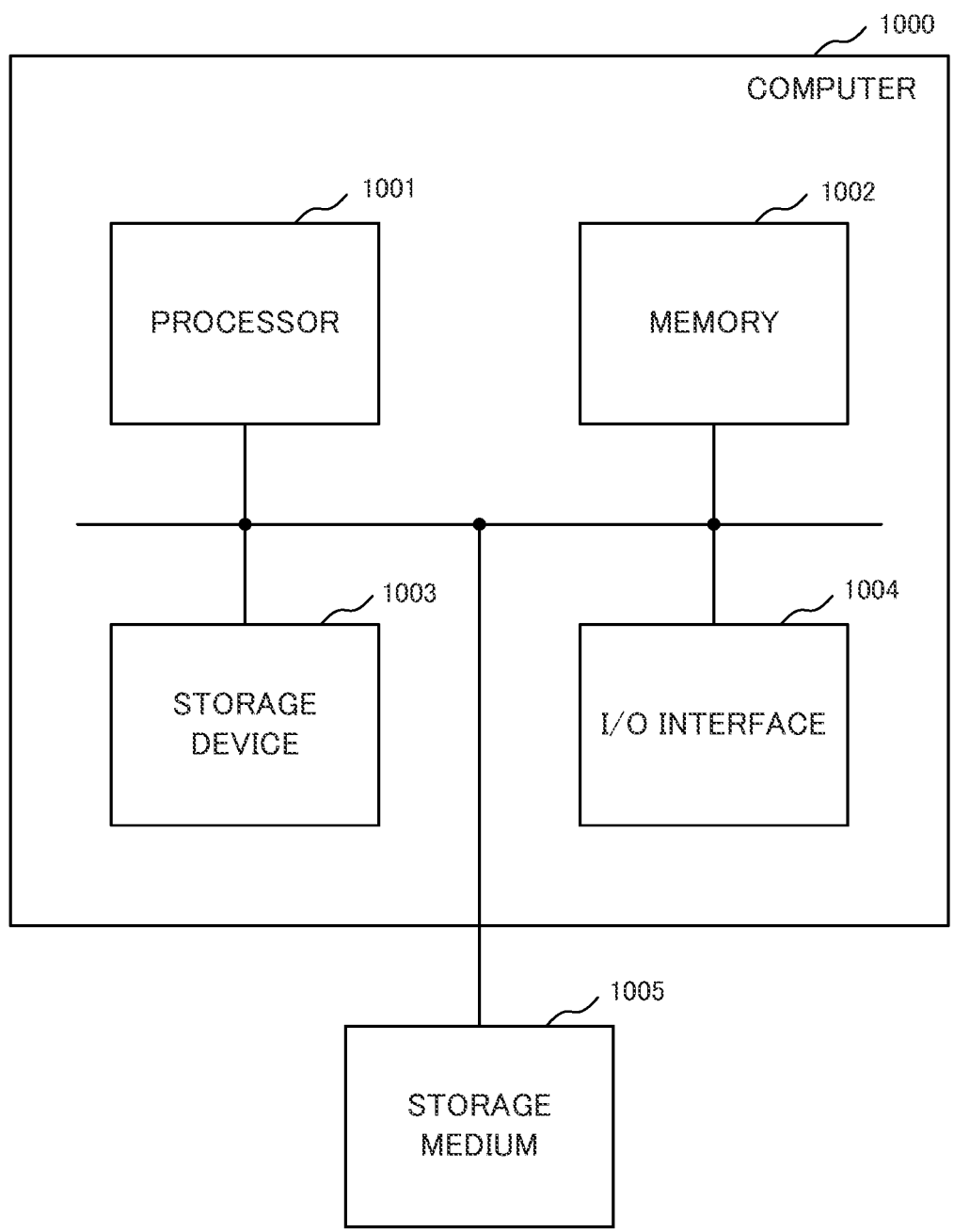
FIG. 8 is a diagram illustrating an example of a hardware configuration of a computer according to an example embodiment of the present disclosure.

FIG. 8 is a diagram illustrating an example of a hardware configuration of a computer 1000 that can achieve each of the analysis device 10, the training device 11, the analysis device 12, and the analysis device 21 according to the example embodiment of the present disclosure. Referring to FIG. 8, the computer 1000 includes a processor 1001, a memory 1002, a storage device 1003, and an I/O (Input/Output) interface 1004. In addition, the computer 1000 can access the storage medium 1005. The memory 1002 and the storage device 1003 are, for example, storage devices such as a random access memory (RAM) and a hard disk. The storage medium 1005 is, for example, a storage device such as a RAM or a hard disk, a read only memory (ROM), or a portable storage medium. The storage device 1003 may be the storage medium 1005. The processor 1001 can read and write data and programs from and in the memory 1002 and the storage device 1003. The processor 1001 can access, for example, other devices via the I/O interface 1004. The processor 1001 may access the storage medium 1005. The storage medium 1005 stores a program for operating the computer 1000 as any of the analysis device 10, the training device 11, the analysis device 12, and the analysis device 21 according to the example embodiments of the present disclosure.

The processor 1001 loads a program, which is stored in the storage medium 1005 and causes the computer 1000 to operate as any of the analysis device 10, the training device 11, the analysis device 12, and the analysis device 21 according to the example embodiment of the present disclosure, into the memory 1002. Then, the processor 1001 executes the program loaded in the memory 1002, whereby the computer 1000 operates the computer 1000 as the analysis device 10, the training device 11, the analysis device 12, or the analysis device 21 according to the example embodiment of the present disclosure.

The first receiving unit 111, the first extraction unit 112, the training unit 113, the first reading unit 114, and the transmitting unit 115 can be achieved by, for example, the processor 1001 that executes a program loaded from the storage medium 1005 that stores the program into the memory 1002. The second receiving unit 121, the second extraction unit 122, the determination unit 123, the output unit 124, the second reading unit 126, and the receiving unit 127 can be achieved by, for example, the processor 1001 that executes a program loaded from the storage medium 1005 that stores the program into the memory 1002. The input/output unit 132 can be achieved by, for example, the processor 1001 that executes a program loaded from the storage medium 1005 that stores the program into the memory 1002. Furthermore, the model storage unit 125 and the geospatial information storage unit 131 can be achieved by a memory 1002 included in the computer 1000 or a storage device 1003 such as a hard disk device.

Some or all of the first receiving unit 111, the first extraction unit 112, the training unit 113, the first reading unit 114, and the transmitting unit 115 can also be achieved by a dedicated circuit that achieves the functions of the units. Some or all of the second receiving unit 121, the second extraction unit 122, the determination unit 123, the output unit 124, the model storage unit 125, the second reading unit 126, and the receiving unit 127 can be achieved by a dedicated circuit that achieves the functions of the units. A part or all of the geospatial information storage unit 131 and the input/output unit 132 can also be achieved by a dedicated circuit that achieves the functions of the units.

Further, some or all of the above example embodiments may be described as the following supplementary notes, but are not limited to the following.

(Supplementary Note 1)

An analysis device including:
a first extraction unit which extracts values of geospatial information at a plurality of points on a ground surface from a plurality of types of geospatial information, the plurality of types of geospatial information each representing at least a state of the ground surface or a state beneath the ground surface; and a training unit which trains a determination model based on height displacements at the plurality of points and the extracted values of the geospatial information in such a way that the determination model determines a set of the geospatial information contributing to the height displacement based on at least a part of the values of the geospatial information.

(Supplementary Note 2)

The analysis device according to supplementary note 1, further including:
a second extraction means configured to training unit which extracts a value of the geospatial information at a target point;
a determination means configured to determine, based on the value of the geospatial information at the target point by using the determination model, the set of geospatial information contributing to a target displacement that is a height displacement at the target point; and
an output training unit which outputs the set of the geospatial information contributing to the target displacement.

(Supplementary Note 3)

The analysis device according to supplementary note 2, wherein
the training unit trains the determination model in such a way that the determination model further determines a degree of contribution of the set of the geospatial information contributing to the height displacement,
the determination unit determines a degree of contribution of the geospatial information contributing to the target displacement by using the determination model, and
the output unit further outputs the determined degree of the contribution.

(Supplementary Note 4)

The analysis device according to supplementary note 2 or 3, wherein
the training unit trains the determination model based on the height displacement at the plurality of points and the extracted value of the geospatial information in such a way that the determination model further predicts a future height displacement based on at least a part of the values of the geospatial information,
the determination unit further predicts the target displacement based on the value of the geospatial information at the target point by the determination model, and the output unit outputs the prediction of the target displacement.

(Supplementary Note 5)

The analysis device according to any one of supplementary notes 1 to 4, wherein
the training unit derives a condition for a value of at least a part of the geospatial information and a prediction expression for predicting the future height displacement under a situation in which the condition is satisfied,
the prediction expression is represented by a linear combination of variables each representing the geospatial information, and
the determination model determines a set of the geospatial information represented by the variables in the prediction expression as a set of the geospatial information contributing to a height displacement under the situation in which the conditions are satisfied.

(Supplementary Note 6)
An analysis device including:
a first extraction training unit which extracts values of geospatial information at a plurality of points on a ground surface from a plurality of types of geospatial information, the plurality of types of geospatial information each representing at least a state of the ground surface or a state beneath the ground surface; and
a training unit which trains a determination model based on height displacements at the plurality of points and the extracted values of the geospatial information in such a way that the determination model predicts the height displacement based on at least a part of the values of the geospatial information.

(Supplementary Note 7)
The analysis device according to supplementary note 6, further including:
a second extraction training unit which extracts a value of the geospatial information at a target point;
a determination training unit which predicts, based on the value of the geospatial information at the target point by using the determination model, a target displacement that is the height displacement at the target point; and
an output training unit which outputs the predicted target displacement.

(Supplementary Note 8)
An analysis method including:
extracting values of geospatial information at a plurality of points on a ground surface from a plurality of types of geospatial information, the plurality of types of geospatial information each representing at least a state of the ground surface or a state beneath the ground surface; and
training a determination model based on height displacements at the plurality of points and the extracted values of the geospatial information in such a way that the determination model determines a set of the geospatial information contributing to the height displacement based on at least a part of the values of the geospatial information.

(Supplementary Note 9)
The analysis method according to supplementary note 8, further including:
extracting a value of the geospatial information at a target point;
determining, based on the value of the geospatial information at the target point by using the determination model, the set of geospatial information contributing to a target displacement that is a height displacement at the target point; and
outputting the set of the geospatial information contributing to the target displacement.

(Supplementary Note 10)
The analysis method according to supplementary note 9, further including:
training the determination model in such a way that the determination model further determines a degree of contribution of the set of the geospatial information contributing to the height displacement;
determining a degree of contribution of the geospatial information contributing to the target displacement by using the determination model; and
outputting the determined degree of the contribution.

(Supplementary Note 11)
The analysis method according to Note 9 or 10, further including:
training the determination model based on the height displacement at the plurality of points and the extracted value of the geospatial information in such a way that the determination model further predicts a future height displacement based on at least a part of the values of the geospatial information;
further predicting the target displacement based on the value of the geospatial information at the target point by using the determination model; and
outputting the prediction of the target displacement.

(Supplementary Note 12)
The analysis method according to any one of supplementary notes 8 to 11, further including:
deriving a condition for a value of at least a part of the geospatial information and a prediction expression for predicting the future height displacement under a situation in which of the condition is satisfied;
representing the prediction expression by a linear combination of variables each representing the geospatial information; and
determining, by the determination model, a set of the geospatial information represented by the variables in the prediction expression as a set of the geospatial information contributing to a height displacement under the situation in which the condition is satisfied.

(Supplementary Note 13)
An analysis method including:
extracting values of geospatial information at a plurality of points on a ground surface from a plurality of types of geospatial information, the plurality of types of geospatial information each representing at least a state of the ground surface or a state beneath the ground surface; and
training a determination model based on height displacements at the plurality of points and the extracted values of the geospatial information in such a way that the determination model predicts the height displacement based on at least a part of the values of the geospatial information.

(Supplementary Note 14)
The analysis method according to claim 13, further including:
extracting a value of the geospatial information at a target point;
predicting, based on the value of the geospatial information at the target point by using the determination model, a target displacement that is the height displacement at the target point; and
outputting the predicted target displacement.

(Supplementary Note 15)
A storage medium storing a program for causing a computer to execute:
first extraction processing of extracting values of geospatial information at a plurality of points on a ground surface from a plurality of types of geospatial information, the plurality of types of geospatial information each representing at least a state of the ground surface or a state beneath the ground surface; and
training processing of training a determination model based on height displacements at the plurality of points and the extracted values of the geospatial information in such a way that the determination model determines a set of the geospatial information contributing to the height displacement based on at least a part of the values of the geospatial information.

(Supplementary Note 16)

The storage medium according to supplementary note 15, wherein the program causes the computer to further execute:

second extraction processing of extracting a value of the geospatial information at a target point;

determination processing of determining, based on the value of the geospatial information at the target point by using the determination model, the set of geospatial information contributing to a target displacement that is a height displacement at the target point; and output processing of outputting the set of the geospatial information contributing to the target displacement.

(Supplementary Note 17)

The storage medium according to supplementary note 16, wherein the training processing trains the determination model in such a way that the determination model further determines a degree of contribution of the set of the geospatial information contributing to the height displacement, the determination processing determines a degree of contribution of the geospatial information contributing to the target displacement by the determination model, and the output processing further outputs the determined degree of the contribution.

(Supplementary Note 18)

The storage medium according to supplementary note 16 or 17, wherein the training processing trains the determination model based on the height displacement at the plurality of points and the extracted value of the geospatial information in such a way that the determination model further predicts a future height displacement based on at least a part of the values of the geospatial information, the determination processing further predicts the target displacement based on the value of the geospatial information at the target point by using the determination model, and the output processing outputs the prediction of the target displacement.

(Supplementary Note 19)

The storage medium according to any one of supplementary notes 15 to 18, wherein the training processing derives a condition for a value of at least a part of the geospatial information and a prediction expression for predicting the future height displacement under a situation in which the condition is satisfied, the prediction expression is represented by a linear combination of variables each representing the geospatial information, and the determination model determines a set of the geospatial information represented by the variables in the prediction expression as a set of the geospatial information contributing to a height displacement under the situation in which the condition is satisfied.

(Supplementary Note 20)

A storage medium storing a program for causing a computer to execute:

first extraction processing of extracting values of geospatial information at a plurality of points on a ground surface from a plurality of types of geospatial information, the plurality of types of geospatial information each representing at least a state of the ground surface and a state beneath the ground surface; and training processing of training a determination model based on height displacements at the plurality of points and the extracted values of the geospatial information in such a way that the determination model predicts the height displacement based on at least a part of the values of the geospatial information.

(Supplementary Note 21)

The storage medium according to supplementary note 20, wherein the program causes the computer to further execute:

second extraction processing of extracting a value of the geospatial information at a target point;

determination processing of predicting, based on the value of the geospatial information at the target point by using the determination model, a target displacement that is the height displacement at the target point; and output processing of outputting the predicted target displacement.

While the disclosure has been particularly shown and described with reference to exemplary embodiments thereof, the disclosure x is not limited to these embodiments. It will be understood by those of ordinary skill in the art that various changes in form and details may be made therein without departing from the spirit and scope of the present invention as defined by the claims.

REFERENCE SIGNS LIST 1 analysis system
10 analysis device
11 training device
12 analysis device
21 analysis device
31 geospatial information storage device
40 network
51 terminal device
111 first receiving unit
112 first extraction unit
113 training unit
114 first reading unit
115 transmitting unit
121 second receiving unit
122 second extraction unit
123 determination unit
124 output unit
125 model storage unit
126 second reading unit
127 receiving unit
131 geospatial information storage unit
132 input/output unit
1000 computer
1001 processor
1002 memory
1003 storage device
1004 I/O interface
1005 storage medium

The invention claimed is:

1. An analysis device comprising:
at least one memory storing instructions; and
at least one processor configured to execute the instructions to:
extract values of geospatial information at a plurality of points on a ground surface from a plurality of types of geospatial information, the plurality of types of geospatial information each representing at least a state of the ground surface or a state beneath the ground surface;

train a determination model based on height displacements at the plurality of points and the extracted values of the geospatial information in such a way that the determination model determines a set of the geospatial information contributing to the height displacement based on at least a part of the values of the geospatial information;

extract a value of the geospatial information at a target point;

determine, based on the value of the geospatial information at the target point by using the determination model, the set of geospatial information contributing to a target displacement that is a height displacement at the target point;

output the set of the geospatial information contributing to the target displacement;

train the determination model based on the height displacement at the plurality of points and the extracted value of the geospatial information in such a way that the determination model further predicts a future height displacement based on at least a part of the values of the geospatial information;

further predict the target displacement based on the value of the geospatial information at the target point by using the determination model, and output the prediction of the target displacement.

2. An analysis method performed by a computer and comprising:

extracting values of geospatial information at a plurality of points on a ground surface from a plurality of types of geospatial information, the plurality of types of geospatial information each representing at least a state of the ground surface or a state beneath the ground surface;

training a determination model based on height displacements at the plurality of points and the extracted values of the geospatial information in such a way that the determination model determines a set of the geospatial information contributing to the height displacement based on at least a part of the values of the geospatial information;

extracting the value of the geospatial information at a target point;

determining, based on the value of the geospatial information at the target point by using the determination model, the set of geospatial information contributing to a target displacement that is a height displacement at the target point;

outputting the set of the geospatial information contributing to the target displacement;

training the determination model based on the height displacement at the plurality of points and the extracted value of the geospatial information in such a way that the determination model further predicts a future height displacement based on at least a part of the values of the geospatial information;

further predicting the target displacement based on the value of the geospatial information at the target point by using the determination model; and outputting the prediction of the target displacement.

3. An analysis device comprising:

at least one memory storing instructions; and at least one processor configured to execute the instructions to:

extract values of geospatial information at a plurality of points on a ground surface from a plurality of types of geospatial information, the plurality of types of geospatial information each representing at least a state of the ground surface or a state beneath the ground surface;

train a determination model based on height displacements at the plurality of points and the extracted values of the geospatial information in such a way that the determination model determines a set of the geospatial information contributing to the height displacement based on at least a part of the values of the geospatial information; and derive a condition for a value of at least a part of the geospatial information and a prediction expression for predicting the future height displacement under a situation in which the condition is satisfied, wherein the prediction expression is represented by a linear combination of variables each representing the geospatial information, and the determination model determines a set of the geospatial information represented by the variables in the prediction expression as a set of the geospatial information contributing to a height displacement under the situation in which the condition is satisfied.

4. An analysis method performed by a computer and comprising:

extracting values of geospatial information at a plurality of points on a ground surface from a plurality of types of geospatial information, the plurality of types of geospatial information each representing at least a state of the ground surface or a state beneath the ground surface;

training a determination model based on height displacements at the plurality of points and the extracted values of the geospatial information in such a way that the determination model determines a set of the geospatial information contributing to the height displacement based on at least a part of the values of the geospatial information;

deriving a condition for a value of at least a part of the geospatial information and a prediction expression for predicting the future height displacement under a situation in which the condition is satisfied;

representing the prediction expression by a linear combination of variables each representing the geospatial information; and determining, by the determination model, a set of the geospatial information represented by the variables in the prediction expression as a set of the geospatial information contributing to a height displacement under the situation in which the condition is satisfied.

* * * * *